United States Patent Office 3,362,125
Patented Jan. 9, 1968

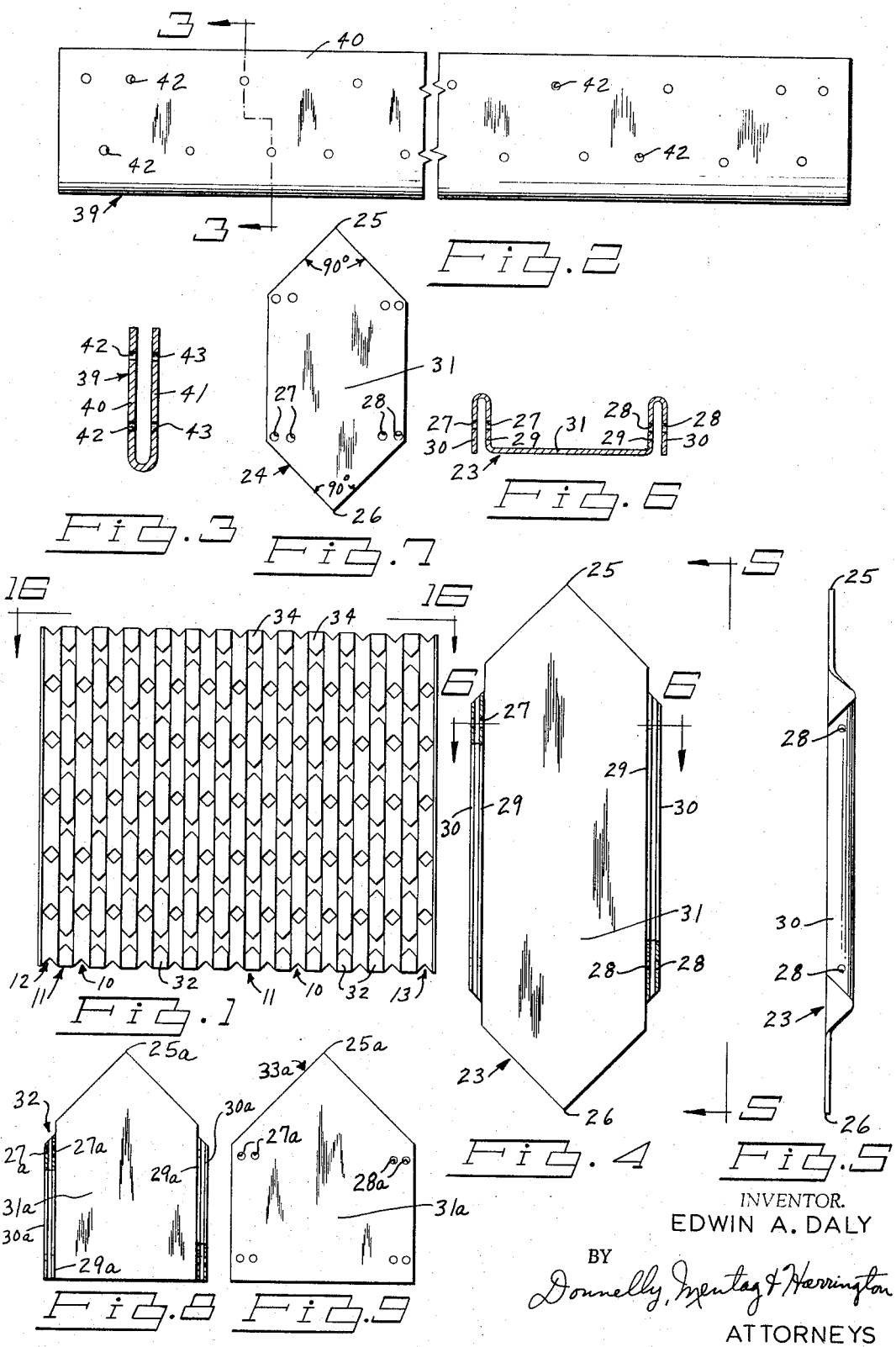

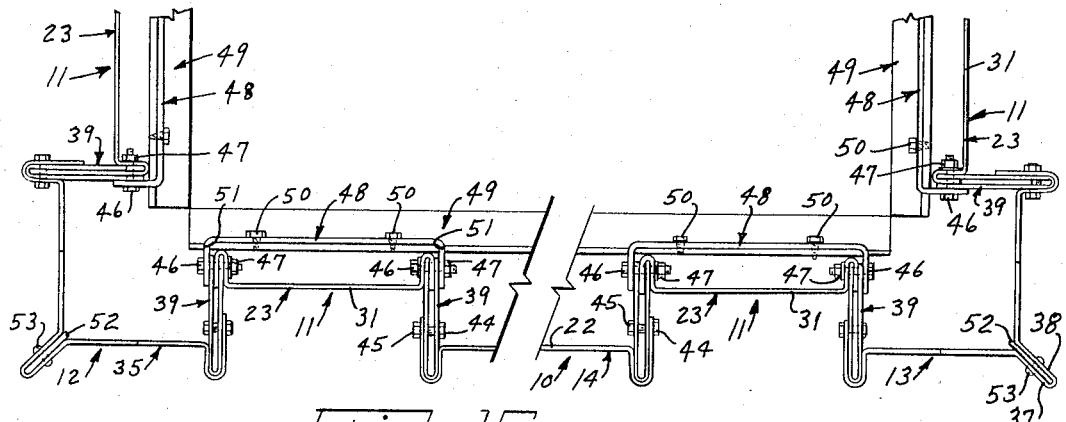
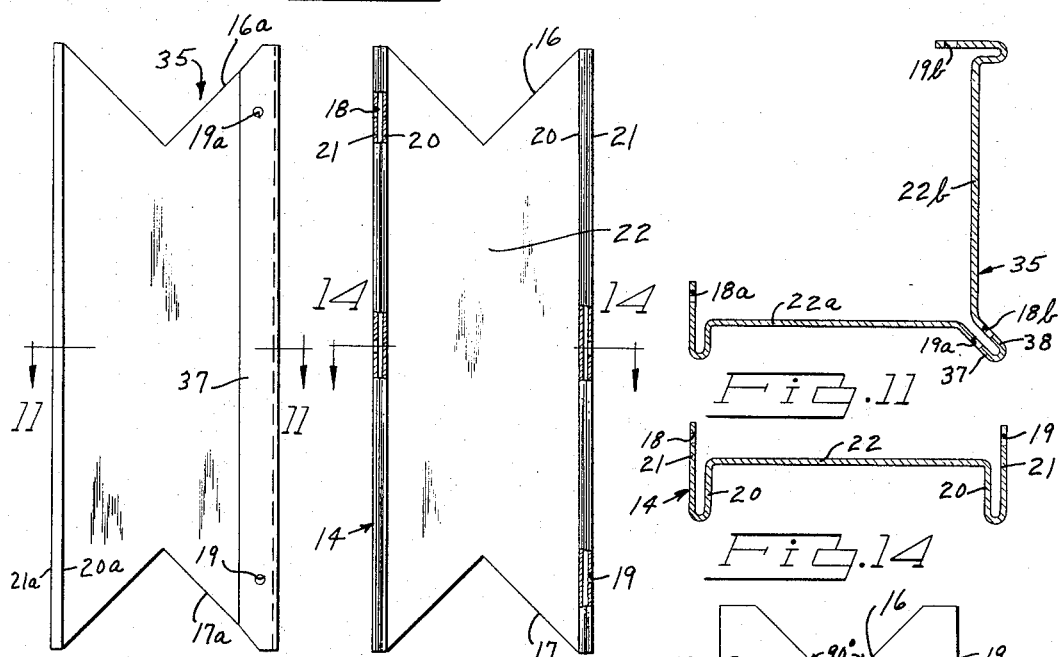
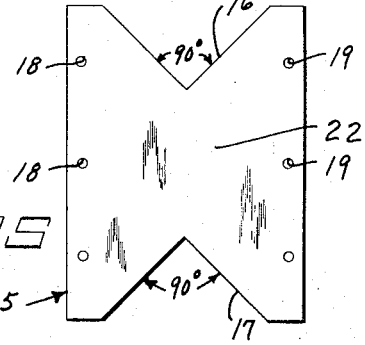
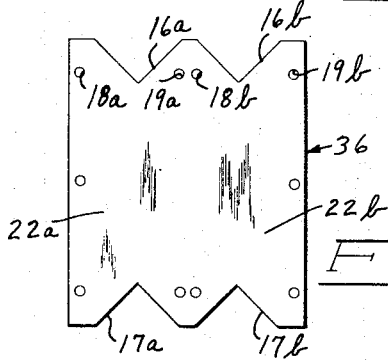
INVENTOR.
EDWIN A. DALY

3,362,125
BUILDING SIDING
Edwin A. Daly, Detroit, Mich., assignor to Walcon Corporation, Ecorse, Mich., a corporation of Michigan
Filed Aug. 10, 1964, Ser. No. 388,370
1 Claim. (Cl. 52—542)

This invention relates generally to improvements in the building siding art, and more particularly, to a novel and improved building siding construction of the ornamental solar screen type.

It is an important object of this invention to provide a novel and improved building siding of the solar screen type which is decorative in appearance and which is light in weight, and may be quickly and easily mounted on the outer surface of a building to enhance its appearance and value.

It is another object of the present invention to provide a novel and improved building solar screen which includes a plurality of vertical panels which are alternately spaced in inner and outer spaced apart positions, and wherein each of said panels comprises a plurality of identically shaped panel portions which are assembled to provide a decorative appearance. The panel portions forming the outer panels may be colored, as for example, they may be colored white, and the panel portions forming the inner panels may be provided with a different color, as for example, they may be colored gray, to further enhance the ornamental appearance of the solar screen. The panel portions may be made in various widths, lengths and shapes, whereby a solar screen is provided which is flexible in design in that these various features may be varied to provide any desired ornamental appearance. The various panel portions may be made from any suitable metal as well as any suitable size or gauge.

It is still another object of the present invention to provide a novel and improved building solar screen which includes a plurality of alternately disposed inner and outer spaced apart panels, and wherein each of the panels comprises a plurality of panel portions which are secured together by vertically disposed connector members which also connect together the inner and outer disposed panels.

It is still another object of this invention to provide a novel and improved building solar screen which is simple and compact in construction, and economical of manufacture.

Other objects, features and advantages of this invention will be apparent from the following detailed description, appended claims, and the accompanying drawings.

In the drawings:

FIG. 1 is a front elevational view of a building solar screen made in accordance with the principles of the present invention;

FIG. 2 is a broken, elevational side view of one of the vertical stringers or connector strips employed in the solar screen of FIG. 1;

FIG. 3 is an elevational sectional view of the structure illustrated in FIG. 2, taken along the line 3—3 thereof, and looking in the direction of the arrows;

FIG. 4 is a front elevational view of one of the panel portions employed in forming the back or inwardly disposed panels of the structure illustrated in FIG. 1;

FIG. 5 is a right side elevational view of the structure illustrated in FIG. 4, taken along the line 5—5 thereof, and looking in the direction of the arrows;

FIG. 6 is a horizontal sectional view of the structure illustrated in FIG. 4, taken along the line 6—6 thereof, and looking in the direction of the arrows;

FIG. 7 is a reduced plan view of a metal blank from which the panel of FIG. 4 is formed;

FIG. 8 is a front elevational view of the panel portion which forms the lowermost and uppermost portions of the back or inwardly disposed panels;

FIG. 9 is a plan view of the metal blank from which the panel portion of FIG. 8 is formed;

FIG. 10 is a front elevational view of one of the panel portions used to form the left and right end front panels for the solar screen shown in FIG. 1;

FIG. 11 is a slightly enlarged, horizontal sectional view of the structure illustrated in FIG. 10, taken along the line 11—11 thereof, and looking in the direction of the arrows;

FIG. 12 is a plan view of the metal plate from which the panel portion of FIG. 10 is formed;

FIG. 13 is a front elevational view of one of the panel portions which is used to form the front or outer panels of the solar screen illustrated in FIG. 1;

FIG. 14 is a slightly enlarged, horizontal sectional view of the structure illustrated in FIG. 13, taken along the line 14-14 thereof, and looking in the direction of the arrows;

FIG. 15 is an elevational view of a flat plate used to form the panel illustrated in FIG. 13; and, FIG. 16 is a broken, fragmentary, enlarged top view of the solar screen structure illustrated in FIG. 1, taken along the line 16—16 thereof, and looking in the direction of the arrows.

Referring now to the drawings, FIG. 1 illustrates a solar screen or building siding made in accordance with the principles of the present invention. As illustrated in FIGS. 1 and 16, the solar screen of the present invention comprises a plurality of vertically disposed, laterally spaced apart front or outwardly disposed panels generally indicated by the numeral 10, and a plurality of alternately disposed vertical, laterally spaced apart back or inner panels generally indicated by the numeral 11. The solar screen further includes the corner panels generally indicated by the numerals 12 and 13 which function as front or outer panels in the same manner as the panels 10.

The front or outer panels 10 are each formed from a plurality of vertically disposed, aligned panel portions generally indicated by the numeral 14 in FIG. 13. FIGS. 13 and 14 illustrate in enlarged view or enlarged condition the front elevation and cross sectional shape of the panel portions 14. FIG. 15 illustrates in a reduced plan view the basic shape of the metal plate from which the panel portions 14 are formed and this plate is designated generally by the numeral 15.

The metal blanks 15 may be made from any suitable metallic material, as for example, aluminum. It will be understood, however, that plastic or any other suitable material may be employed but that aluminum is preferable. The blanks 15 are provided with a baked enamel finish and are colored, as for example in one embodiment, the blanks 15 were colored white. The blanks 15 are substantially rectangular in overall plan configuration and are provided on each of the ends thereof with the inwardly extended triangular recesses or cut-outs 16 and 17. The recesses 16 and 17 may be formed to any angular configuration, as for example, the angle at the inner ends thereof may be a 90° angle. The blanks 15 are also provided with the bolt holes 18 and 19 along the outer sides thereof for fabricating the formed panel portions 14 into the complete panels 10.

In one illustrative embodiment, the panel portion blanks 15 were formed to a size sixteen inches (16″) in width, and two feet, six inches (2′ 6″) in height.

As shown in FIGS. 13 and 14, the side portions of the blanks 15 are first folded outwardly for approximately a distance of one inch and then they are folded backwardly or inwardly to form a pair of substantially U-shaped mounting members along each side of the formed panel portion 14 for assembling the panel portion in one of the front panels 10. The outwardly directed portions of the mounting members are indicated by the numerals 20 in FIG. 14 and the inwardly directed portions are indicated by the numerals 21 also in FIG. 14. It will be seen in FIG. 14 that the outer mounting member portions 21 extend inwardly beyond the main body portion 22 of the panel portions 14 for assembly purposes as will be more fully explained hereinafter.

The back or inner panels are mainly composed of a plurality of panel portions generally indicated by the numeral 23 in FIGS. 4, 5 and 6. FIG. 7 illustrates in a reduced condition, a blank 24 of the type from which the panel portions 23 are formed. The blank 24 is formed from the same material as the blanks 15 and in one embodiment, they were colored gray. As shown in FIG. 7, the blank 24 is substantially rectangular with the two-pointed end portions 25 and 26 which are formed with a point of approximately 90°. In one embodiment, the over-all width of the blank was one foot, two inches (1' 2") and the over-all length of the blank from tip to tip of the points 25 and 26 was two feet, six inches (2' 6"). The blank 24 is provided with a plurality of pairs of holes along the sides thereof, as for example, the bolt holes 27 and 28. As shown in FIGS. 4, 5 and 6, the side edge portions of the blank 24 are bent backwardly and then folded over and extended forwardly to provide a pair of mounting members comprising the inner leg portions 29 and the outer leg portions 30. The mounting member leg portions 29 and 30 are spaced apart and form a substantially U-shaped mounting member for mounting the panel portions 23 together to comprise the back panels 11, as more fully described hereinafter. As best seen in FIG. 6, the mounting members are disposed on each end of the main body portion 31 of the panel portions 23 and the over-all width in one embodiment, of the panel portions 23, was approximately ten inches (10").

FIGS. 8 and 9 illustrate the construction of the panel portion 32 which is the lower panel portion in the back panels 11 as shown in FIG. 1. The lower panel portions 32 are formed similar to the panel portions 23 and the corresponding parts have been marked with similar reference numerals, followed by the small letter *a*. The only difference is that the panel portions 32 comprise substantially the upper one-half of the panel portions 23. The panel portions 32 are formed from the blank 33 which is illustrated in FIG. 9 and which is substantially one-half of a blank 24 of the type used to form the panel portions 23.

As shown in FIG. 1, the panels 11 are provided on the upper end thereof with a panel portion 34 which is formed identical to the lower panel portion 32 but which is mounted in a reverse position.

FIGS. 10, 11 and 12 illustrate in detail the panel portions 35 which are used to form the outer end panels 12 and 13. FIG. 12 designates or shows a blank 36 from which the individual panel portions 35 are formed. The blank 36 is in effect a combination of two of the blanks 15 disposed side-by-side and joined together so as to provide a pair of integral panel portions shaped similar to the panel portions 14 but disposed 90° to each other as indicated by the numeral 35 in FIG. 11. Accordingly, the parts which are similar to the panel portions 14 have been marked with the same reference numerals followed by the small letters *a* and *b* to indicate the two panel portions which are disposed 90° to each other and which are integrally joined at the center part thereof by the diagonally disposed mounting member which is U-shaped in cross section and which is formed by the integral outwardly extended spaced apart legs 37 and 38. The mounting member legs 37 and 38 are extended outward at an angle of substantially 45° relative to the planes of the main body portions or parts of the panel portions 35. The panel portions 35 are made from the same material as the previously described panel portions 14, 23 and 32. The panel portions 35 in one embodiment were approximately two feet six inches (2' 6") high and this was the same dimension for the panel portions 14 in that embodiment. The over-all width of each of the side portions of the panel portion 35 in said embodiment was approximately ten inches.

FIGS. 2 and 3 illustrate the vertical connector strip or stringer 39 which is used to connect the aforedescribed panel portions into the various panels 10, 11, 12 and 13. As shown in FIGS. 2 and 3, the connector member 39 is formed from an elongated rectangular strip of material which is folded back on itself to form a U-shaped member having the spaced apart leg portions 40 and 41 in which are formed the spaced apart bolt holes 42 and 43. In one illustrative embodiment the connector member 39 is approximately twenty-six feet and ten inches (26' 10") in length and three and one-half feet (3½') in width. The connector members 39 are formed from the same material as the aforedescribed panel portions.

It will be understood that the aforedescribed panel portions may be pre-assembled or prefabricated into sub-units in the shop for further and final fabrication on the job. For example, in order to save time on the job, a number of panels 10 and 11 may be assembled in the shop and built up to a size which may be easily transported to the job site. The various sub-assemblies may then be quickly and easily assembled and mounted on the side of a building in less time than if all the panel portions were separately fabricated on the job site.

As shown in FIG. 16, the connector stringers or connector members 39 are first mounted in the U-shaped mounting legs 20 and 21 of the outer panel portions and then they are secured to these panel portions by the bolts and nuts 44 and 45, respectively. It will be understood that the panel portions 14 are disposed evenly along the connector members 39 in any desired spacing arrangement.

As further shown in FIG. 16, the back or inwardly disposed panels 11 are formed by mounting on the inner edge of the connector members 39 a plurality of the panel portions 23 by means of a plurality of bolts 46 and nuts 47. As shown in FIG. 16, one of the legs of the connector members 39 extends into the mounting member on the ends of the panel portions 23, 32 and 34, and the other leg of the connecting member is disposed on the outer side of these panel portion connecting members. The bolts 46 further function to secure to the connector members 39 the legs of the U-shaped mounting bracket generally indicated by the numeral 48 in FIG. 16. The legs of this mounting bracket are disposed on the outer sides of a pair of the connector members 39. As shown in FIG. 16, the brackets 48 are adapted to be used to support the screen on the side of a building in any suitable manner. As illustrated, the mounting brackets 48 are secured to the vertical leg of a mounting angle 49. A vertical leg of the mounting angle 49 would be provided with suitable slots 51 for the reception of the legs of the mounting bracket 48. Suitable screws as 50 would be used for securing the bracket 48 to the vertical leg of the angle 49.

When it is desired to extend the screen around two or more sides of a building, the corner panel portions 35 are used to form the corner panels 12 and 13 to make a corner construction similar in appearance to the outer or front panels 11. The screens formed on the other sides of the building can be constructed in the same manner as the aforedescribed screen structure for the first side of the building.

As shown in FIG. 16 the diagonally disposed connecting members on the corner panel portions 35 are joined by the plurality of pieces of flat stock 52 which are secured in place by any suitable means as by the rivets 53.

The flat stock connector members 52 are approximately ten inches (10″) in length and one-and-a-half (1½) inches in width in the embodiments as previously described and function to provide rigidity to the corner panels 12 and 13.

While it will be apparent that the preferred embodiments of the invention herein disclosed are well calculated to fulfill the objects above stated, it will be appreciated that the invention is susceptible to modification, variation and change without departing from the proper scope or fair meaning of the sub-joined claims.

What I claim is:

1. A building screen comprising: a plurality of alternate inwardly and outwardly disposed elongated vertical panels; each of the outwardly disposed panels being formed from a plurality of separately formed, vertically spaced apart, panel portions having a first configuration on each end thereof; each of the inwardly disposed panels being formed from a plurality of separately formed, vertically spaced apart, panel portions having a second configuration on each end thereof; means for connecting said panels together comprising a plurality of elongated, U-shaped connecting members with the bight portions thereof disposed outwardly and the spaced apart legs inwardly; the panel portions of the outwardly disposed panels being provided with U-shaped, inwardly facing, mounting members on the side edges thereof which are mounted over the closed bight outward edges of a pair of adjacent U-shaped elongated connecting members; the panel portions of the inwardly disposed panels being provided with U-shaped, outwardly facing, mounting members on the side edges thereof which are mounted over the adjacent legs of a pair of adjacent elongated, U-shaped, connecting members; means for securing the U-shaped mounting members on the side edges of the outwardly and inwardly disposed panel portions to their respective U-shaped elongated connecting members; and, means for securing the screen to a building.

References Cited
UNITED STATES PATENTS

| | | | |
|---|---|---|---|
| 1,083,773 | 1/1914 | Taylor | 52—278 X |
| 2,511,074 | 6/1950 | Miller | 52—278 X |
| 2,685,715 | 8/1954 | Helt | 52—473 |
| 2,733,485 | 2/1956 | Knight | 52—473 X |
| 2,797,452 | 7/1957 | Vetere | 52—473 |
| 3,015,135 | 1/1962 | Dean et al. | 52—473 X |
| 3,016,584 | 1/1962 | Fatula | 52—473 X |

FRANK L. ABBOTT, *Primary Examiner.*

MICHAEL O. WARNECKE, CHARLES G. MUELLER, *Assistant Examiners.*